(12) United States Patent
Tanaka (10) Patent No.: US 9,383,219 B2
(45) Date of Patent: Jul. 5, 2016

(54) INFORMATION DISPLAY DEVICE AND INFORMATION DISPLAY METHOD

(71) Applicant: CLARION CO., LTD., Saitama (JP)

(72) Inventor: Atsushi Tanaka, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 14/660,120

(22) Filed: Mar. 17, 2015

(65) Prior Publication Data

US 2015/0308854 A1 Oct. 29, 2015

(30) Foreign Application Priority Data

Apr. 23, 2014 (JP) ................................. 2014-089008

(51) Int. Cl.
*G01C 21/36* (2006.01)
*G08G 1/123* (2006.01)

(52) U.S. Cl.
CPC .................................. *G01C 21/3697* (2013.01)

(58) Field of Classification Search
CPC ..... G01C 21/36; G01C 21/3697; G08G 1/123
USPC ........ 701/439, 431, 432; 340/995.1; 345/419, 345/663
See application file for complete search history.

(56) References Cited

U.S. PATENT DOCUMENTS

| 7,733,244 | B2 * | 6/2010 | Asada | G01C 21/3647 340/995.1 |
| 2005/0071082 | A1 * | 3/2005 | Ohmura | G01C 21/365 701/431 |
| 2012/0249589 | A1 * | 10/2012 | Gassner | G02B 27/01 345/633 |
| 2013/0181982 | A1 * | 7/2013 | Tasaki | B60K 35/00 345/419 |
| 2014/0347489 | A1 * | 11/2014 | Kumon | B60R 1/00 348/148 |

FOREIGN PATENT DOCUMENTS

| JP | H08-083397 A | 3/1996 |
| JP | 2007-145310 A | 6/2007 |
| JP | 2009-250919 A | 10/2009 |

OTHER PUBLICATIONS

English Abstract and Machine Translation for H08-083397 Publication Date: Mar. 26, 1996.
English Abstract and Machine Translation for 2009-250919 Publication Date: Oct. 29, 2009.
English Abstract and Machine Translation for 2007-145310 Publication Date: Jun. 14, 2007.

* cited by examiner

*Primary Examiner* — Tan Q Nguyen (57) ABSTRACT

An information display device for displaying predetermined information while overlapping the predetermined information with a landscape having a prediction unit that obtains information on a route at a traveling front side and predicts a visual-line movement destination of a user on the basis of the obtained information, and a display controller that changes a display position for the predetermined information on the basis of a prediction result of the prediction unit.

13 Claims, 11 Drawing Sheets

INFORMATION DISPLAY DEVICE AND INFORMATION DISPLAY METHOD

INCORPORATION BY REFERENCE

The present application claims priority under 35 U.S.C. §119 to Japanese Patent Application No. 2014-089008 filed on Apr. 23, 2014. The content of the application is incorporated herein by reference in its entirety.

TECHNICAL FIELD

The present invention relates to an information display device and an information display method.

BACKGROUND ART

Japanese Laid-open Patent Application No. 2007-145310 (hereinafter referred to as "PTL 1") discloses a background art in the technical field of this application. This publication describes, as an object, "to provide a display system for a vehicle that enables a drive to more rapidly recognize important information such as high urgency information or the like", and also describes, as solving means, "the display system has four displays 30a to 30d and visual line direction detecting means for detecting the visual line direction of the driver, and with respect to predetermined important information, the display system displays it on a display 30 which is nearest to the visual line direction detected by the visual line direction detecting means among the four displays 30a to 30d, whereby the driver can recognize the important information rapidly irrespective of the visual line direction of the driver".

SUMMARY

Technical Problem

An environmental condition around a vehicle varies in accordance with traveling of the vehicle, and a direction along which the driver is currently viewing or has viewed with high frequency till now is not necessarily coincident with a direction along which the driver will view in the near future or is about to view. The technique disclosed in the PTL 1 does not consider this point.

The present invention has been implemented in view of the foregoing circumstances, and has an object to provide an information display device and an information display method that enable a user (e.g., a driver) to watch information easily.

Solution to Problem

In order to attain the above object, according to the present invention, an information display device for displaying predetermined information while overlapping the predetermined information with a landscape or the like comprises: a prediction unit that obtains information on a route (course) of a traveling front side and predicts a visual-line movement destination of a user on the basis of the obtained information, and a display controller that changes a display position on the basis of a prediction result of the prediction unit.

According to the present invention, the user can easily watch information.

DESCRIPTION OF EMBODIMENTS

An embodiment according to the present invention will be described with reference to the accompanying drawings.

Figure 1:
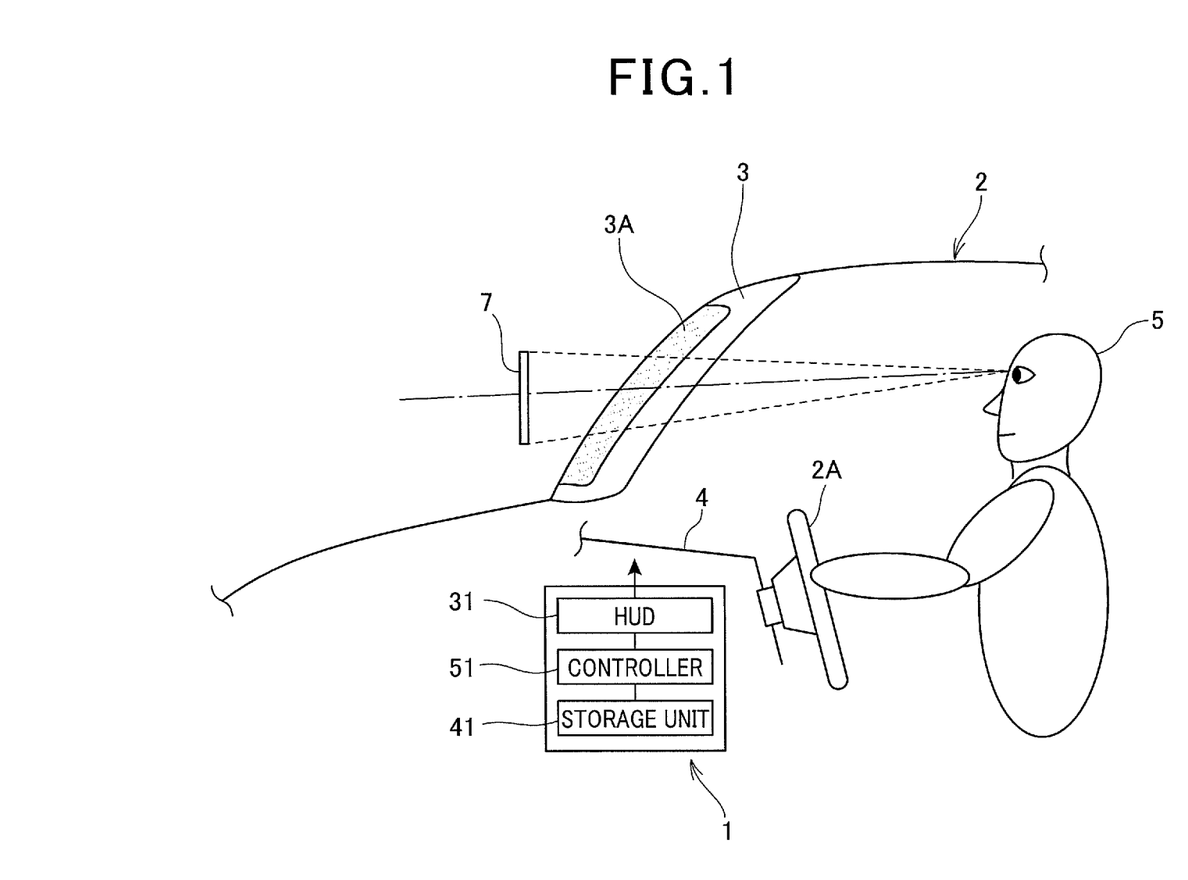
FIG. 1 is a schematic diagram showing an installation mode of an information display device for a vehicle according to an embodiment of the present invention.
Figure 2:
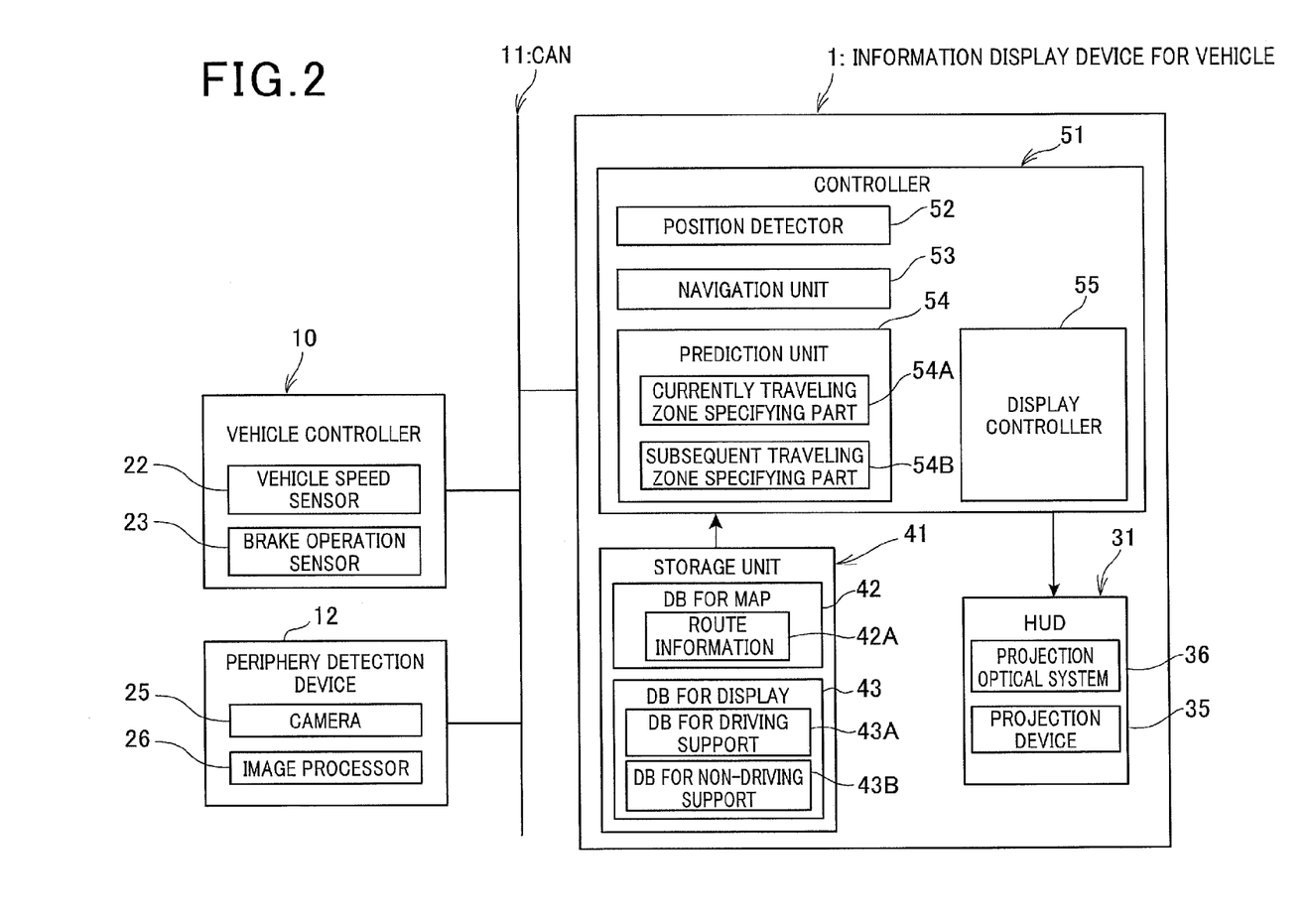
FIG. 2 is a block diagram showing a driving support system containing the information display device for the vehicle.

FIG. 1 is a schematic diagram showing an installation mode of an information display device 1 for a vehicle (hereinafter referred to as "vehicle information display device 1") according to this embodiment, and FIG. 2 is a block diagram showing a driving support system containing the vehicle information display device 1.

As shown in FIG. 1, the vehicle information display device 1 is installed in a dashboard 4 below the front window 3 of the vehicle 2. The vehicle information display device 1 is configured as an in-vehicle mount device for displaying various kinds of information for a driver 5 (user) who operates the steering wheel 2A of the vehicle 2, etc., and it is equipped with HUD 31, a storage unit (for example, a memory) 41 and a controller (for example, a processor) 51.

HUD 31 is a so-called head-up display (HUD), and functions as a display device which projects an image onto the front window 3 and displays a virtual image 7 such that the virtual image 7 is overlapped with a landscape (also called as a foreground) viewed through the front window 3 by projecting an image onto the front window 3.

The information display device 1 also functions as a driving support device for supporting the driving of the driver 5 by displaying information relating to a driving operation (for example, speed warning, etc.) as the virtual image 7.

As shown in FIG. 2, the vehicle 2 is equipped with a vehicle controller 10 and a periphery detection device 12 as well as the vehicle information display device 1, and these devices and the information display device 1 are connected to one another through CAN (Controller Area Network) 11, and mutually give and receive information. In place of CAN 11, any communication circuit such as an in-vehicle mount LAN or the like may be used.

The vehicle controller 10 detects traveling information as information relating to the traveling of the vehicle 2, and outputs the information to the vehicle information display device 1. More specifically, the vehicle controller 10 detects and outputs, as the traveling information, at least vehicle speed information representing the speed of the vehicle 2 and brake operation information representing whether the brake is set to an operation state or not. That is, the vehicle controller 10 has a vehicle speed sensor 22 and a brake operation sensor 23. The vehicle speed 22 is a sensor for detecting the vehicle speed of the vehicle 2 by measuring the number of rotations of the wheels and the number of rotations of the power output side of a transmission, and detecting whether the side brake is set to an operation state or not. The traveling information may contain any other information as well as the above information. In order to detect such a type of information, the vehicle controller 10 may be equipped with a proper sensor.

The periphery detection device 12 is a device for detecting objects existing around the vehicle 2 (the vehicle which the user drives), and particularly it detects the positional relationship between the vehicle 2 and each object existing at a front side of the vehicle 2 in the traveling direction thereof (hereinafter referred to as "traveling front side"). In this embodiment, the periphery detection device 12 has a camera 25 for imaging the periphery, and an image processor 26 for executing predetermined processing on images picked up by the camera 25.

The camera 25 is an imaging device such as a compact CCD or the like for successively imaging the periphery containing at least the traveling front side of the vehicle 2 in the traveling direction thereof. The image processor 2 executes image recognition processing on an image picked up by the camera 25 to detect the presence or absence of predetermined target objects. The target objects contain a preceding vehicle (s) traveling in front of the vehicle concerned (i.e., the vehicle 2) with respect to the traveling direction, pedestrians, on-road installations, on-road obstacles, a traffic lane, etc., for example.

Furthermore, when a target object as described above is detected, the image processor 26 determines the size of the target object, and the distance and direction from the vehicle 2 concerned to the target object, and calculates the positional relationship between the vehicle 2 and the target object and variation of the positional relationship through the image processing of the pickup image.

A device having no camera 25 may be used as the periphery detection device 12, and for example, a radar ranging device may be used. Furthermore, both a camera type and a radar type may be used to interpolate a recognition result.

HUD 31 has a projection device 35 and a projection optical system 36. The projection device 35 makes an projection image of the virtual image 7 incident to the projection optical system 36 under the control of the controller 51. The projection optical system 36 is an optical system for projecting a projection image from the projection device 35 onto the front window 3 of the vehicle 2, and projects the projection image on a projection face 3A (FIG. 1) of a predetermined size set on the front window 3 while enlarging the projection image. A reflection type optical device or a transmission type optical device may be suitably used as an optical device constituting the projection optical system 36. Any display mode may be used as the display mode for the virtual image 7 in HUD 31.

Figure 3:
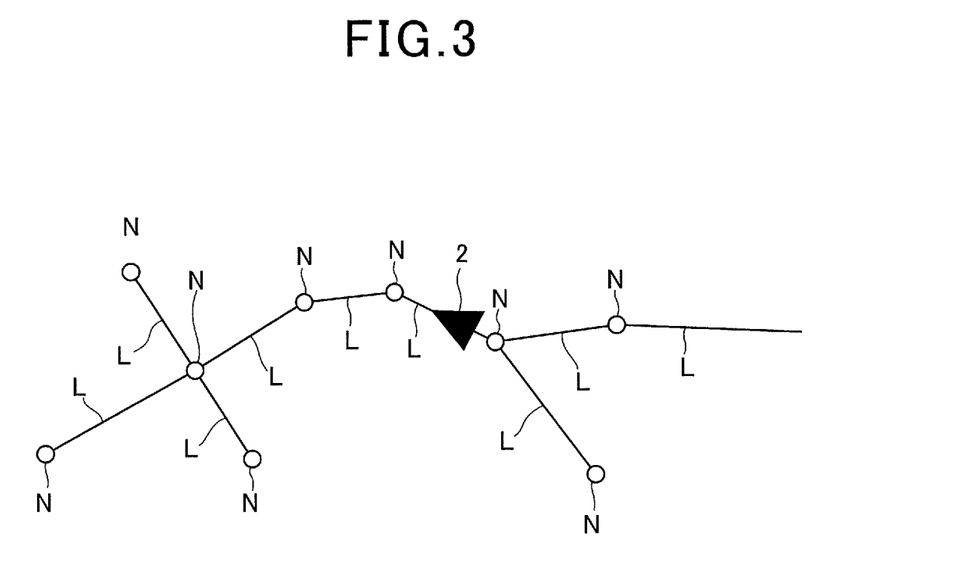
FIG. 3 is a diagram showing road links and road nodes.

As shown in FIG. 2, the storage unit 41 has a map data base 42, and a display data base 43. In FIG. 2 and the following description, the data base is represented by "DB". The map DB 42 stores map data containing route information 42A as information on routes along which the vehicle is allowed to travel (i.e., travelable routes), and the route information 42A contains road information as information on roads on which the vehicle 2 or the like travels. The road information is constructed by data containing road links (lines represented by character L in FIG. 3) as shown in FIG. 3.

The road link approximates the shape of a road by a line every predetermined traveling zone, a road node (a point represented by character N in FIG. 3) is allocated to a node (intersection point) between respective road links, and a road network is represented by the road links and the road nodes. In FIG. 3, the current position of the vehicle 2 is represented by a blacked triangle, and the most acute apex of the triangle represents the front side of the vehicle 2 with respect to the traveling direction, that is, the traveling direction of the vehicle 2.

Figure 4A:
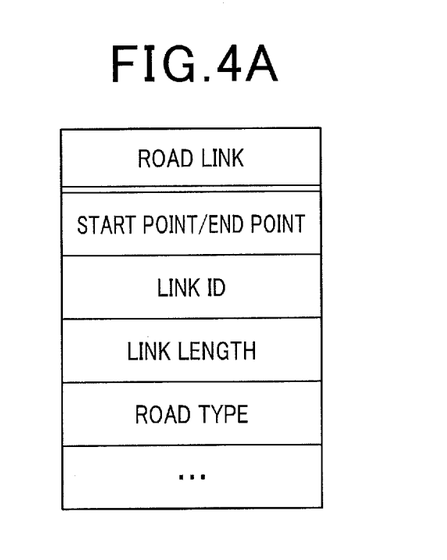
FIG. 4A is a diagram showing a road link.
Figure 4B:
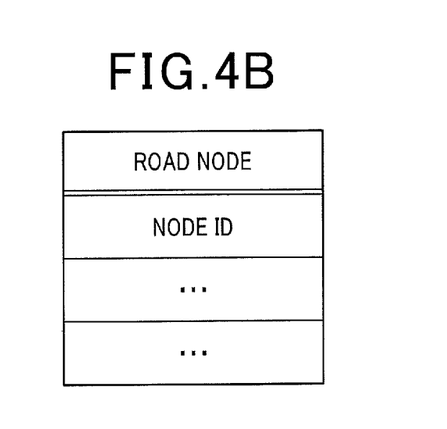
FIG. 4B is a diagram showing road nodes.

A unique number (link ID) for specifying each road link, start point/end point of a road zone represented by the road link, a link length, a road type (national road, prefectural road, etc.), etc. are allocated to the road link as shown in FIG. 4A. A unique number (node ID) for specifying each road node, a traffic regulation and lane information for road links connected to each other through the road node, etc. are allocated to the road node. The route information 32A contains a legal speed of a road and various kinds of regulation information. The name of a traffic intersection serving as a landmark at the place corresponding to each road node, symbol data of facilities existing around the road node, image data at the traffic intersection, etc. may be contained in connection with the road node. Publicly known information containing road nodes and road links may be broadly and suitably applicable.

The display DB 43 shown in FIG. 2 stores information on display targets. The information on the display targets is roughly classified into driving support information GA for supporting the driving operation of a driver 5 (see FIG. 9A, etc.) and information other than the driving support information GA (hereinafter referred to as "non-driving support information GT"). In this embodiment, the information on the display targets are classified into two groups of information, and these groups of information are divisionally stored into separate data bases, that is, a driving support DB 33A for storing the driving support information GA and a non-driving support DB 33B for storing the non-driving support information GT. However, this embodiment is not limited to the method of divisionally the information into the separate data bases. For example, the information on the display targets may be configured to be discriminable as to whether the information is driving support information GA or not, and then stored in a common data base.

The driving support information GA is information associated with the driving operation, and it is display information relating to speed alarm, obstacle warning (containing pedestrian warning), out-of-traffic-lane alarm and leading-vehicle distance warning. The non-driving support information GT is time information, for example.

The controller 51 executes processing of generating a display image corresponding to the virtual image 7 (FIG. 1) and displaying the display image on HUD 31, etc., and has a position detector 52, a navigation unit 53, a prediction unit 54 and a display controller 55.

The position detector 52 executes position detection processing (position detecting step) for detecting the current position of the vehicle 2, and has a position detecting function such as GPS (Global Positioning System) or the like. The navigation unit 53 executes navigation processing for executing a route guidance to a predetermined destination. Specifically, when a destination is set, a guide route to the destination is searched on the basis of the route information 32A stored in the map DB 32, and a route guidance is executed with voices or information display. Publicly known navigation processing may be broadly applied to the above navigation processing. A navigation program and a control program for executing various kinds of processing concerning the driving support information GA are stored in ROM (not shown) in the controller 51, and read out to and executed by CPU (computer) (not shown).

The display controller 55 controls to display, as a virtual image 7 (FIG. 1), an image for navigation, driving support information GA based on output information of the vehicle controller 10 and output information of the periphery detection device 12, etc. (display control step). The display controller 55 generates a corresponding image on a display screen of HUD 31 by using various kinds of information stored in the storage unit 41, and outputs the image signal corresponding to the image to HUD 31, whereby various images are displayed in front of the driver 5.

The prediction unit 54 shown in FIG. 2 executes prediction processing (prediction step) for predicting a visual line movement destination of the driver 5. For example, in the prediction processing, information concerning a traveling front side of the vehicle 2 is obtained from the storage unit 41 so that a direction along which the driver 5 will view from now or is about to view just now is predicted on the basis of a traveling direction along which the vehicle 2 will travel from now or is about to travel just now, and the visual-line movement destination of the driver 5 is predicted (specified) on the basis of the obtained information.

The prediction unit 54 has a currently traveling zone specifying part 54A and a subsequently traveling zone specifying part 54B. The currently traveling zone specifying part 54A refers to the route information 32A on the basis of the current position detected by the position detector 52, and specifies the road link of a currently traveling zone. Furthermore, the subsequently traveling zone specifying part 54B specifies a subsequently traveling zone (i.e., a traveling zone at the traveling front side of the vehicle 2 traveling in the currently traveling zone) which is located in front of the road link of the currently traveling zone with respect to the traveling of the vehicle 2.

More specifically, when the navigation unit 53 performs a road guidance to a destination, the subsequent travelling zone specifying part 54B refers to the route information 32A on the basis of the guide route, and determines whether any road node exists on the guide route and within a predetermined distance (within 100 m) from the road link of the currently traveling zone. When such road nodes exist, a road link connected to the detected nearest road node is specified as the road link of the subsequently traveling zone. Here, the predetermined distance may be arbitrarily changed.

On the other hand, when the navigation unit 53 does not perform any route guidance or when no route guidance is set, it is impossible to specify the road link of a subsequently traveling zone based on a guide route. In this case, the subsequently traveling zone specifying part 54B executes processing of specifying the road link of the subsequently traveling zone on the basis of information relating to the road link specified by the currently traveling zone specifying part 54A.

For example, on the basis of the road type of the road link of the currently traveling zone (national road, prefectural road or the like), the traveling direction of the vehicle 2, etc., it is assumed that the vehicle travels in the same traveling direction on the same road containing the road link of the currently traveling zone, and then it is determined whether any road node exists within a predetermined distance (within 100 m in this embodiment). When such road nodes exist, a road link containing the detected nearest road node as a start point is specified as the road link of the subsequently traveling zone. The processing of specifying the road link of the subsequently traveling zone and the road link of the currently traveling zone is not limited to the above processing, and other processing may be applied.

The prediction unit 54 repetitively executes the processing of specifying each road link described above, thereby specifying both the links substantially on a real-time basis. When the vehicle speed is equal to zero or it is determined that the vehicle is stopped because a side brake is being operated, it is preferable to interrupt the above processing, and also it is preferable to perform the above processing when it is determined that the vehicle is currently traveling because the vehicle speed exceeds a predetermined threshold value.

When the prediction unit 54 executes the processing of specifying each road link, the display controller 55 calculates the relative angle X (angular difference) between the road link of the currently traveling zone and the road link of the subsequently traveling zone, and executes display position changing processing of changing the displace position of the driving support information GA on the basis of the relative angle X.

In order to facilitate understanding of the present invention, the functional construction (functional block diagram) of the vehicle information display device 1 is illustrated in FIG. 2 so as to be classified in accordance with the main processing content. The construction of the vehicle information display device 1 may be classified into a larger number of constituent elements in accordance with the processing content.

Figure 5:
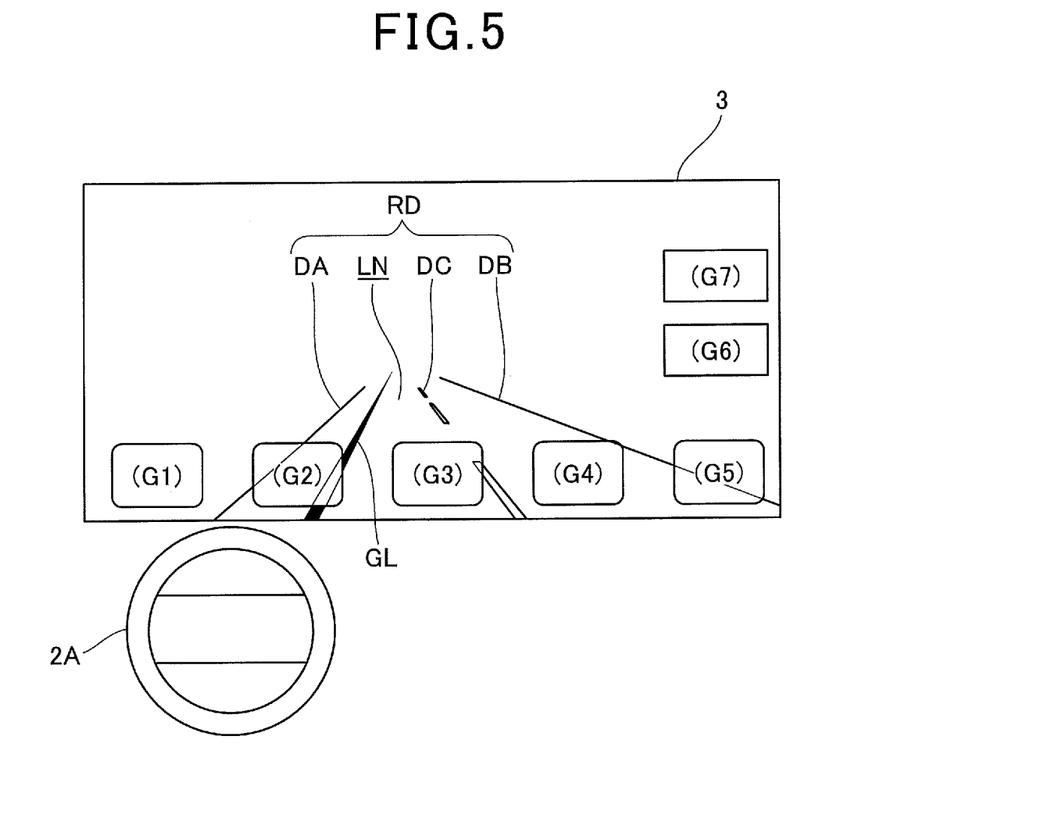
FIG. 5 is a diagram showing a virtual image displayed in front of a driver together with a road which is viewed through a front window.

FIG. 5 shows the virtual image 7 which is displayed in front of the driver 5 through HUD 31 together with a road RD viewed through the front window 3. In FIG. 3, characters DA, DB, DC represent both the ends and center line of the road RD, and the gap between the characters DA and DC represents a travel lane LN of the vehicle 2.

In FIG. 5, a guide image GL representing a guide route is displayed with being overlapped with the road RD (travel lane LN) by HUD 31 when viewed from the driver 5, and plural display areas (G1), (G2), (G3), (G4), (G5), (G6) and (G7) in which information such as the driving support information GA, etc. are displayed by HUD 31 are illustrated.

In this embodiment, the five display areas (G1), (G2), (G3), (G4) and (G5) are set as a display area for displaying the driving support information GA. These display areas (G1) to (G5) are arranged to be spaced from one another in the right-and-left direction over the whole width of the front window 3 when viewed from the driver 5, and the display areas (G1), (G2), (G3), (G4) and (G5) are successively arranged in this order from the left end to the right end. The display area (G3) at the center in the right-and-left direction is provided at the center in the right-and-left direction when viewed from the driver 5.

Figure 6:
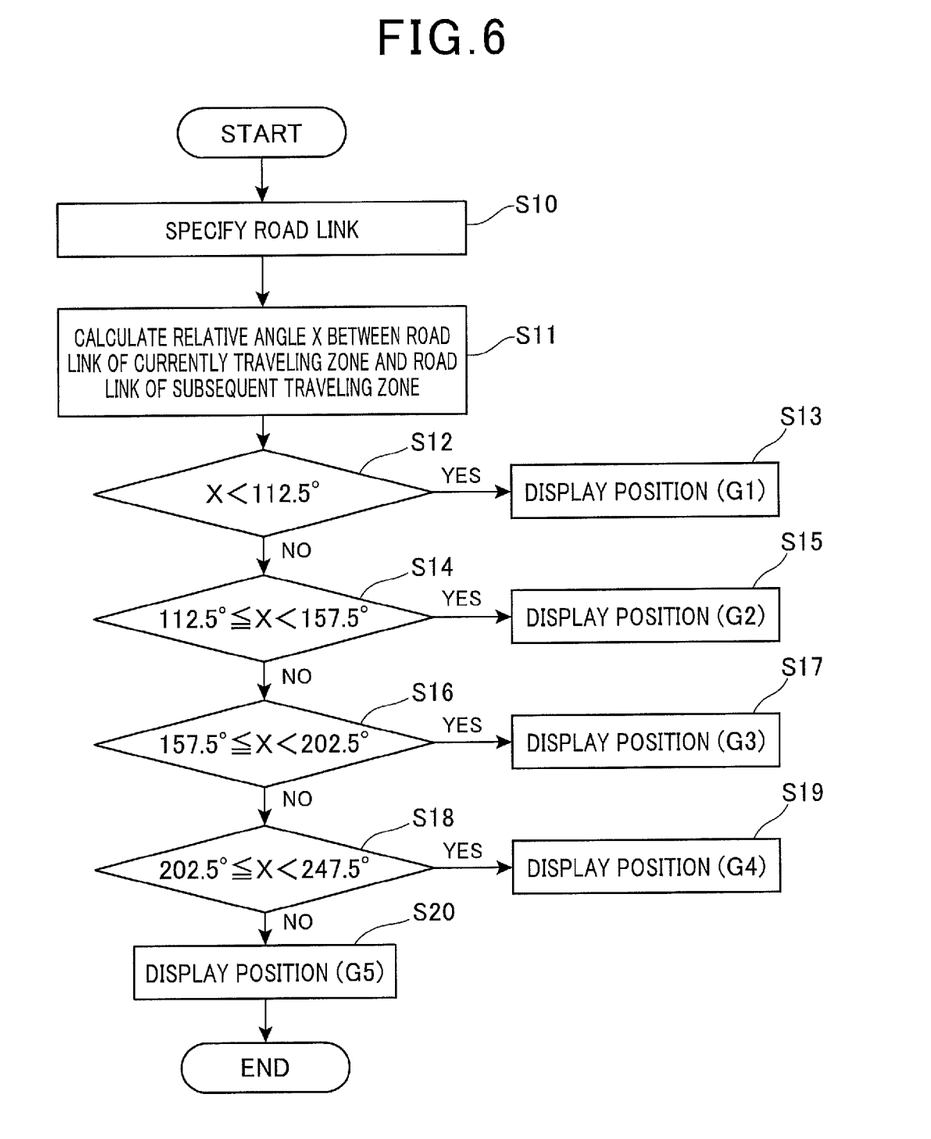
FIG. 6 is a flowchart showing display position changing processing.

FIG. 6 is a flowchart showing the display position changing processing. This display position changing processing is repetitively performed.

Figure 7:
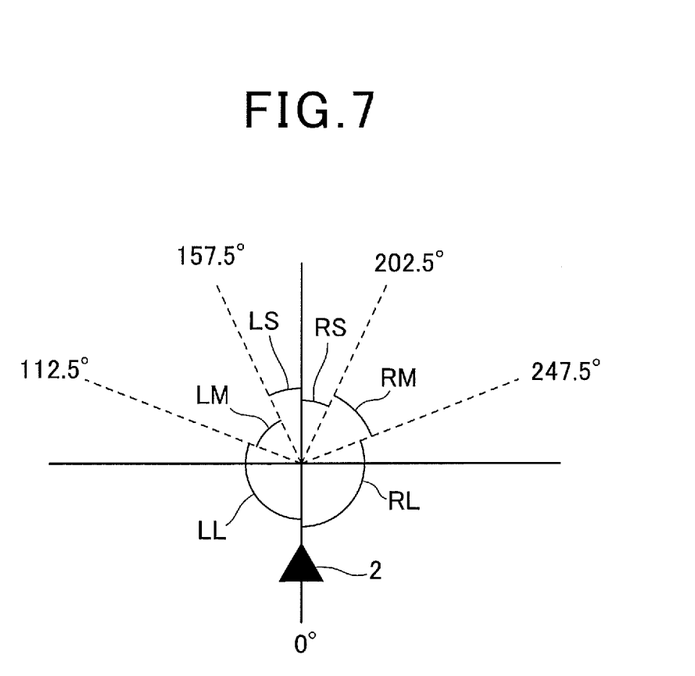
FIG. 7 is a diagram showing the relationship between a relative angle and a vehicle.

First, the controller 51 executes the processing of specifying the road link of the currently traveling zone and the road link of the subsequently traveling zone by the prediction unit 54 (step S10). Subsequently, the controller 51 executes the processing of calculating the relative angle X between the road link of the currently traveling zone and the road link of the subsequently traveling zone (step S11). Here, this relative angle X corresponds to a bending angle from the currently traveling zone to the subsequently traveling zone, that is, a curve angle (curving degree) at a traveling front side of the vehicle 2 traveling on the road in the currently traveling zone with respect to the traveling direction of the vehicle 2. Therefore, when the relative angle X is equal to 0° or 180°, it represents "linear route (course)". FIG. 7 shows the relationship between the relative angle X and the vehicle 2.

In FIG. 7, the vehicle 2 is represented by a blacked triangular image, the direction to the upper side in FIG. 7 corresponds to the traveling direction of the vehicle 2, the direction to the right side in FIG. 7 corresponds to the rightward direction of the vehicle 2, and the direction to the left side in FIG.

7 corresponds to the leftward direction. As shown in FIG. 7, the range of 0°<relative X<180° represents that the road link of the subsequently traveling zone faces the left side of the road link of the currently traveling zone, that is, the traveling front side curves to the left side (containing turning to the left) (hereinafter referred to as "leftward curve").

Furthermore, the range of 180°<relative X<360° represents that the road link of the subsequently traveling zone faces the right side of the road link of the currently traveling zone, that is, the traveling front side curves to the right side (containing turning to the right) (hereinafter referred to as "rightward curve").

In this embodiment, in consideration of the feature that the visual line of the driver 5 is moved to a road RD at the traveling front side of the vehicle 2, the relative angle x between the road link of the currently traveling zone and the road link of the subsequently traveling zone is determined, and the driving support information GA is displayed in a display area which is nearest to the movement destination of the visual line of the driver 5 among the display areas (G1) to (G5). Accordingly, the driving support information GA can be displayed while following the visual line of the driver 5.

The relative angle X is classified into plural angular levels (in this embodiment, three angular levels) in conformity with plural curving degrees (in this embodiment, three curving degrees of curves (large curve, middle curve and small curve) with respect to each of the rightward and leftward curves (i.e., each traveling direction), and the display area nearest to the predicted visual-line movement destination of the driver 5 is specified on the basis of this classification of the relative angle X.

More specifically, as shown in FIG. 7, a range LL for the large curve to the left is defined as an angular range in which the relative angle X is less than 112.5°, a range LM for the middle curve to the left is defined as an angular range in which the relative angle X is not less than 112.5° and is less than 157.5°, and a range LS for the small curve to the left is defined as a range in which the relative angle X is not less than 157.5° and is less than 180.0°.

Furthermore, a range RS for the small curve to the right is defined as a range in which the relative angle X is not less than 180.0° and is less than 202.5°, a range RM for the middle curve to the right is defined as an angular range in which the relative angle X is not less than 202.5° and is less than 247.5°, and a range RL for the large curve to the right is defined as an angular range in which the relative angle X is not less than 247.5°.

Figure 8:
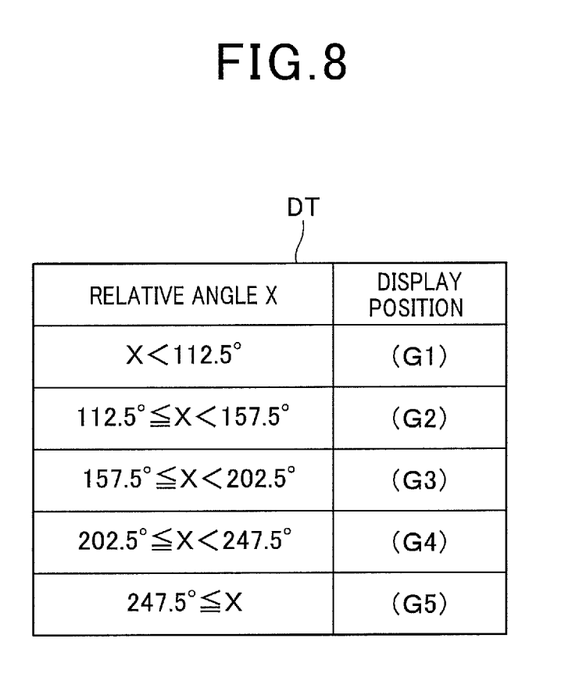
FIG. 8 is a diagram showing the content of data table.

Still furthermore, a data table DT in which the corresponding relationship between the relative angle X and the display position (the display areas (G1) to (G5)) is described is prepared, and the display position corresponding to the movement destination of the visual line of the driver 5 can be easily specified on the basis of the data table DT.

FIG. 8 is a diagram showing the content of the data table DT. The data table DT is stored in the storage unit 41 or the controller 51, and the display position of the range LL for the large curve to the left (the relative angle X is less than 112.5°) is set to the display area (G1) at the leftmost position, and the display position of the range LM for the middle curve to the left (112.5°≤X<157.5°) is set to the display area (G2) which is located at a left side in the right-and-left direction and nearer to the center of the front window 3 than the display position (G1).

The display positions of the ranges LS and RS for the small curve (157.5°≤X<202.5°) at which the movement of the visual line to the right or left is predicted to be relatively small are set to the display area (G3) at the center in the right-and-left direction of the front window 3. The display position of the range RM for the middle curve to the right (202.5°≤X<247.5°) is set to the display area (G4) which is located to be nearer to the right side than the display area (G3), and the display position of the range RL for the large curve to the right (247.5°≤X) is set to the display areas (G5) which is located to be nearer to the right side than the display area (G4).

Referring to FIG. 6, the controller 51 refers to the data table DT to specify the display position (any one of the display areas (G1) to (G5)) corresponding to the relative angle X calculated in step S11, and displays the driving support information GA at the specified display position.

Specifically, when the relative angle X is less than 112.5° (step S12: Yes), the display controller 55 displays the driving support information GA at the display position (G1) (step S13). When the relative angle X is not less than 112.5° and is less than 157.5°(step S14: Yes), the display controller 55 displays the driving support information GA at the display position (G2) (step S15).

When the relative angle X is not less than 157.5° and is less than 202.5° (step S16: Yes), the display controller 55 displays the driving support information GA at the display position (G3) (step S17). Furthermore, when the relative angle X is not less than 202.5° and is less than 247.5° (step S18: Yes), the display controller 55 displays the driving support information GA at the display position (G4) (step S19). In the other case (when the relative angle X is not less than 247.5°), the display controller 55 displays the driving support information GA at the display position (G5) (step S20).

As described above, the display position of the driving support information GA is set to the display position corresponding to the relative angle X obtained before or just before the driving support information GA is displayed. Therefore, the display position is updated every time the relative angle X is obtained. For example, in a case where the driving support information GA is displayed for a relatively long term, even when the driving support information GA is displayed at the display position (G1) at the display start time, the display position may be then changed to another display position (any one of (G2) to (G5)) due to the change of the relative angle X. In FIG. 6, the steps S10 and S11 correspond to a prediction step for predicting the movement destination of the visual line of the driver 5, and the step S12 and subsequent steps correspond to a display control step for changing the display position of information on the basis of a prediction result.

Next, display examples of the driving support information GA will be described.

Figure 9A:
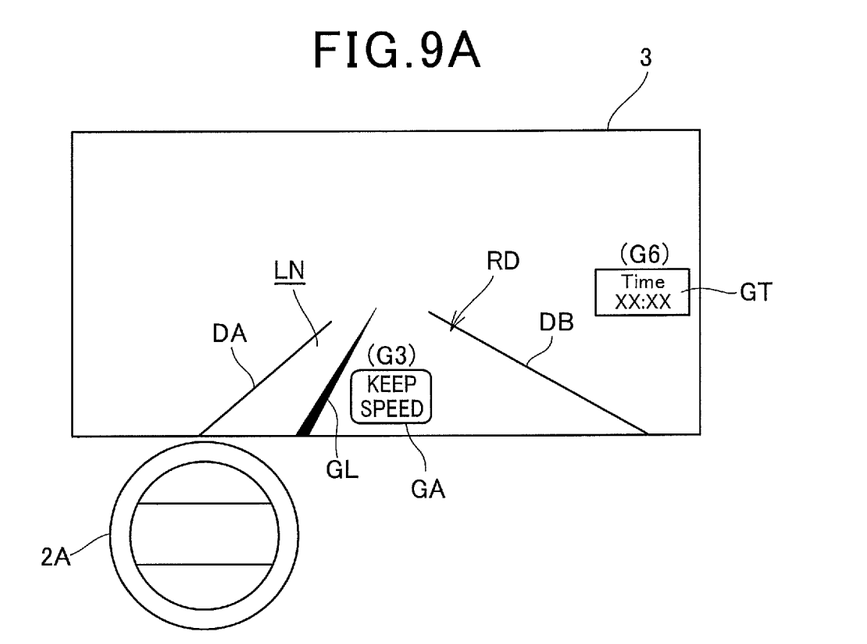
FIGS. 9A and 9B are diagrams showing display examples when a vehicle travels on a substantially linear road.
Figure 9B:
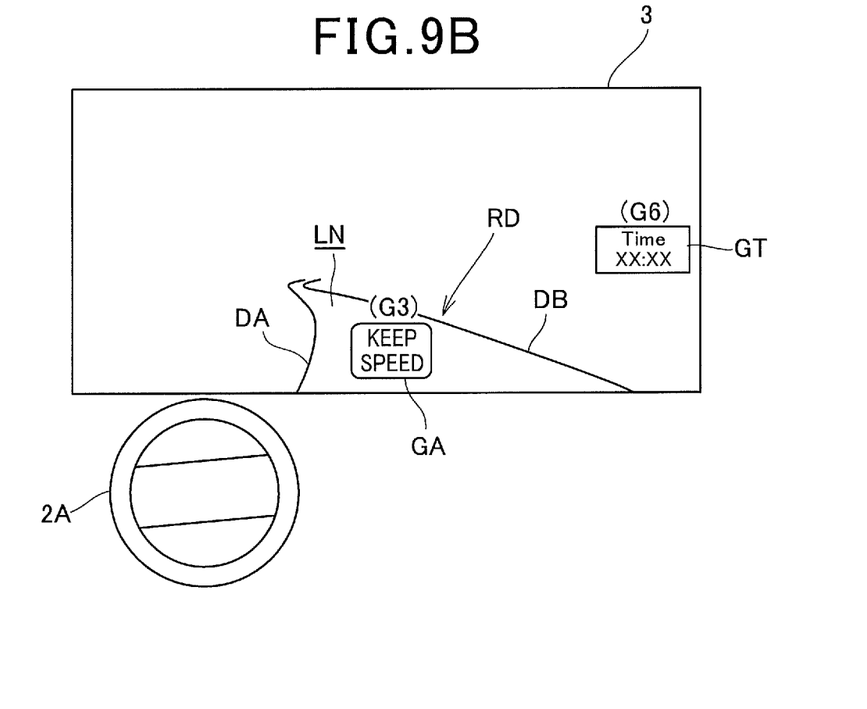

FIGS. 9A and 9B show display examples when the vehicle 2 travels on a substantially linear road RD.

When the road RD on which the vehicle 2 is being traveling is a linear road as shown in FIG. 9A, the relative angle X between the road link of the currently traveling zone and the road link of the subsequently traveling zone is equal to substantially zero. Therefore, when the driving support information Ga of "KEEP SPEED" representing a proper speed is displayed, the driving support information GA is displayed at the display area (G3) at the center in the right-and-left direction on the front window 3.

When the vehicle 2 travels on a linear road, the visual-line movement destination of the driver 5 is expected to be at the center in the right-and-left direction on the front window 3, so that the driving support information GA can be displayed at the visual-line movement destination of the driver 5. Accordingly, the driver 5 can easily watch the driving support information GA while driving the vehicle 2. In FIG. 9A and in the following display example, a non-driving support information GT representing the time is displayed. The non-driving support information GT representing the time is displayed in a predetermined display area (G6) as shown in FIG. 9A.

When the road RD on which the vehicle 2 is being traveling is a small curve as shown in FIG. 9B, the relative angle X is not less than 112.5° and is less than 157.5°, and thus the driving support information GA is displayed at the same position as the traveling on the linear road, that is, in the display area (G3). In this case, the visual-line movement destination of the driver 5 is expected to be at the center in the right-and-left direction or in the neighborhood of the center on the front window 3, so that the driving support information GA can be displayed at the visual-line movement destination of the driver 5. Accordingly, even in the case of the small curve, the driver 5 can easily watch the driving support information GA. The non-driving support information GT is still displayed in the display area (G6).

Figure 10A:
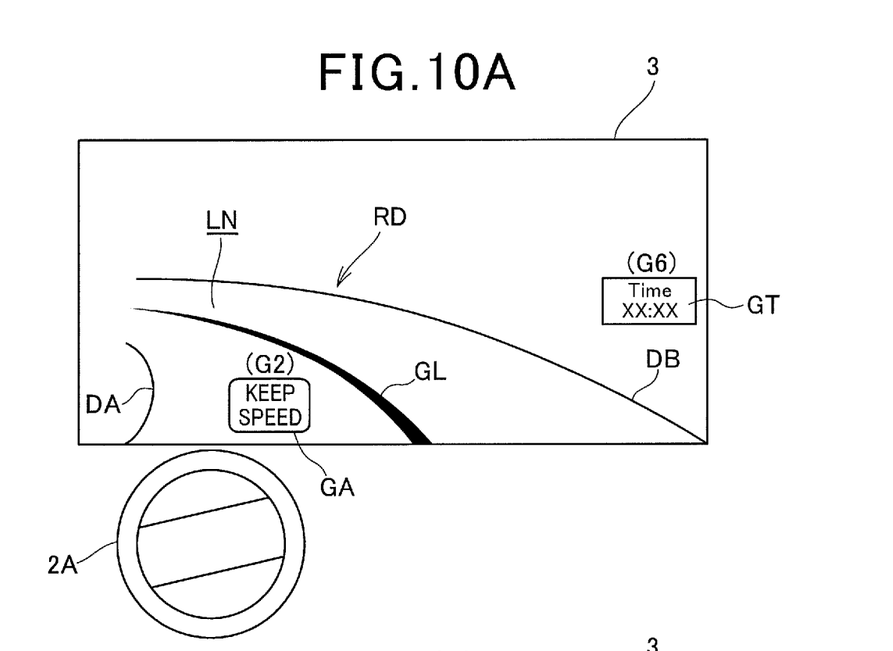
FIGS. 10A and 10B are diagrams showing display examples when the vehicle travels on a road curved to the left.
Figure 10B:
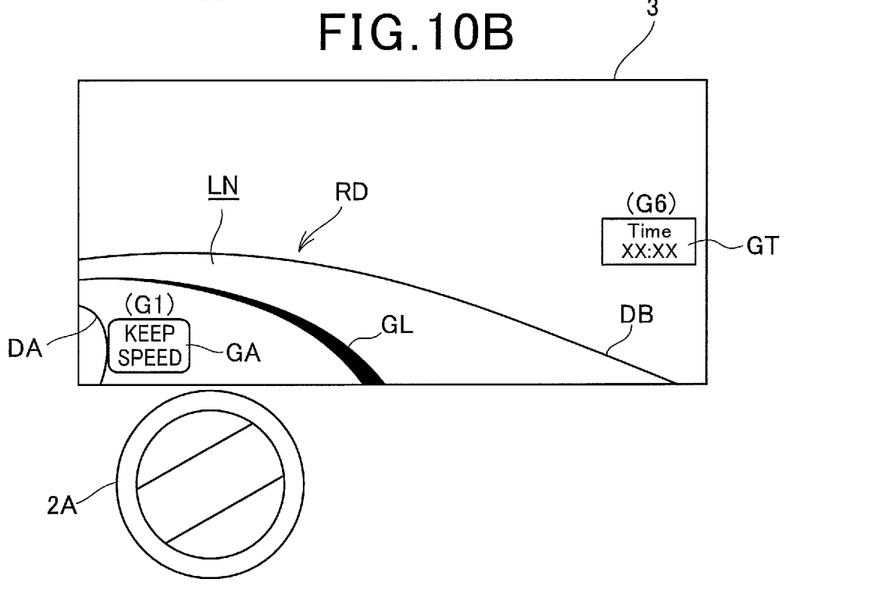

FIGS. 10A and 10B shows display examples when the vehicle 2 travels on a road RD curving to the left. When the road RD at the traveling front side of the vehicle 2 is a middle curve to the left as shown in FIG. 10A, the relative angle X is not less than 112.5° and is less than 157.5°, and thus the driving support information Ga is displayed in the display area (G2).

Furthermore, when the road RD at the traveling front side of the vehicle 2 is a large curve to the left as shown in FIG. 10B, the relative angle X is less than 112.5°, the driving support information GA is displayed in the display area (G1). In general, the visual line of the driver 5 is expected to be shifted to the curving direction of a curved road. Therefore, in both the cases shown in FIGS. 10A and 10B, the driving support information GA can be displayed at the visual-line movement destination of the driver 5. Accordingly, even in the case of roads curving to the left, the driver 5 can easily watch the driving support information GA. The non-driving support information GT is displayed in the display area (G6).

Figure 11A:
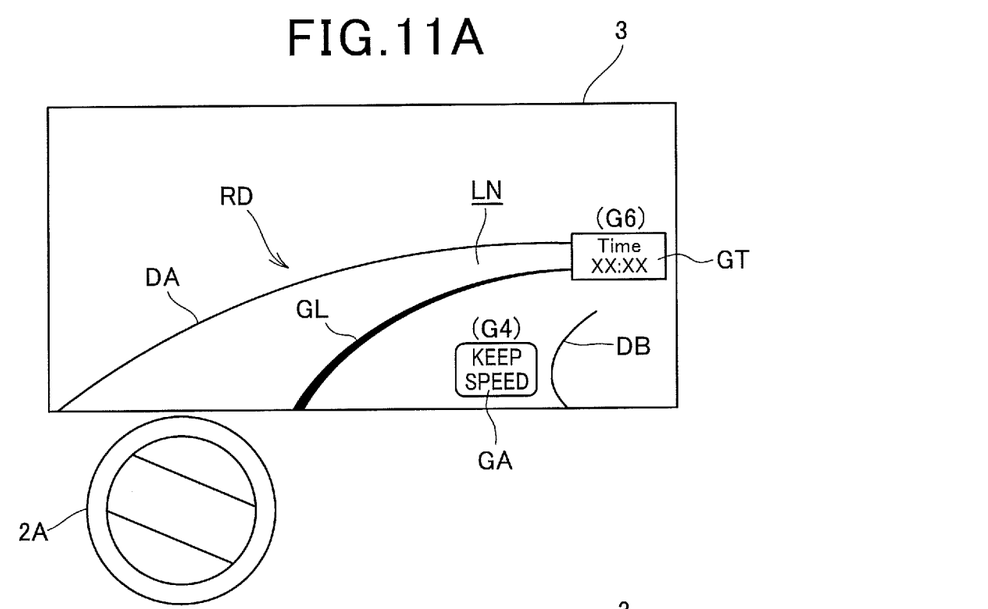
FIGS. 11A and 11B are diagrams showing display examples when the vehicle travels on a road curved to the right.
Figure 11B:
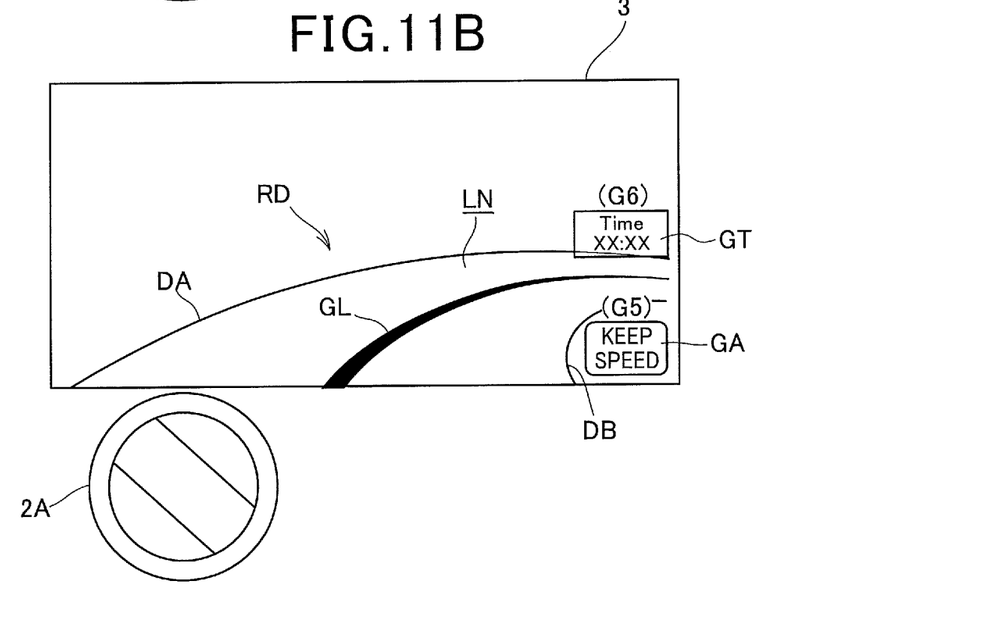

FIGS. 11A and 11B show display examples when the vehicle 2 travels on a road RD curving to the right. When the road RD at the traveling front side of the vehicle 2 is a middle curve to the right as shown in FIG. 11A, the relative angle X is not less than 202.5° and is less than 247.5°, so that the driving support information GA is displayed in the display area (G4).

Furthermore, when the road RD at the traveling front side of the vehicle 2 is a large curve to the right, the relative angle is not less than 247.5°, the driving support information GA is displayed in the display area (G5). As described above, even in the case of roads curving to the right, the driving support information GA can be displayed at the visual-line movement destination of the driver 5, and the driver 5 can easily watch the driving support information GA. The non-driving support information GT is displayed in the display area (G6).

When the vehicle 2 turns to the left at an intersection, the relative angle X is equal to about 90°. Therefore, the driving support information GA is displayed at the display area (G1) as in the case of FIG. 10B. Furthermore, when the vehicle 2 turns to the left at an intersection, the visual line of the driver 5 is expected to greatly shift to the left. Therefore, if the driving support information GA such as obstacle warning or the like is still displayed in the display area (G3) at the center in the right-and-left direction, there would occur a risk that the driving support information GA gets out of the visual field of the driver 5. Furthermore, a load imposed on the driver 5 would increase because the driver 5 must move his/her visual line to watch information in the display area (G3) during turning to the left.

According to this embodiment, since the driving support information GA is displayed in the display area (G1) at the left side when the vehicle 2 turns to the left, the driving support information GA can be displayed at the visual-line movement destination of the driver 5 who views the traveling front side of the vehicle 2. Furthermore, according to this embodiment, the driving support information GA is displayed in the display area (G5) at the right side when the vehicle 2 turns to the right at an intersection, and thus the driving support information GA can be displayed at the visual-line destination of the driver 5 who views the traveling front side even when the vehicle 2 turns to the right side at the intersection. Therefore, the driver 5 can easily watch the driving support information GA.

As described above, according to this embodiment, the predicting unit 54 (FIG. 2) obtains the information on the course (route) of the traveling front side of the vehicle 2, and predicts the visual-line movement destination of the driver (user) 5 on the basis of the obtained information, and the display controller 55 (FIG. 2) changes the current display position of the driving support information GA to the predicted visual-line movement destination. Therefore, the driver 5 can easily and smoothly watch the driving support information GA while driving the vehicle 2 by using no camera for detecting the visual line of the driver 5.

When a camera for detecting the visual line of the driver 5 is used, the cost increases because the number of parts increases or the like, and there occurs such a disadvantage that it is impossible to detect the visual line of the driver 5 when the driver 5 wears sunglasses. However, such a disadvantage does not occur in this embodiment.

In addition, on the basis of data containing at least information on a road condition (road shape or the like) of a travelable course (route), the predicting unit 54 specifies a currently traveling zone on the route and a subsequently traveling zone located in front of the currently traveling zone, and calculates the relative angle X between both the traveling zones to predict a shift position of the visual line of the driver 5 in advance. The display controller 55 changes the current display area of the driving support information GA to the predicted shift position corresponding to the visual-line movement destination of the driver 5. Accordingly, a subsequent traveling direction of the vehicle 2 which is based on the road condition (road shape) of a travelable route can be determined as the visual-line movement destination of the driver 5 with high precision.

Furthermore, the driving support information GA is displayed at a position to which the visual line of the driver 5 will be directed (is about to be directed just now). Therefore, there is also obtained an effect that the driver 5 can preliminarily know a steering direction in accordance with the display position of the driving support information GA. Accordingly, the driver 5 can perform the steering operation with time to spare.

Furthermore, the prediction unit 54 specifies the road link of the currently traveling zone and the road link of the subsequently traveling zone on the basis of the information on the road links as line segments representing road zones, and calculates the relative angle between both the road links as the relative angle X. Therefore, the visual-line movement destination of the driver 5 can be easily predicted with high precision by using the information on the road links. In addition, information of road links which are broadly used for map display or navigation is used, it is unnecessary to use special information dedicated to prediction of the visual-line movement destination.

Still furthermore, the predicting unit 54 specifies the road link of a currently traveling zone on the basis of a current position, and also specifies the road link of a subsequently traveling zone on the basis of a preset guide route to a destination. Therefore, both the road links can be specified with high precision. When no guide route is set, the road link of a traveling expected zone is specified on the assumption that the vehicle travels on the same road containing the road link of the currently traveling zone. Therefore, the road link of the traveling expected zone can be continuously determined, and thus a sensor for detecting the visual line and information dedicated to prediction are unnecessary.

As shown in FIG. 5, the plural different display areas (G1) to (G5) corresponding to the different visual-line movement destinations of the driver 5 are set on the front window 3, and the driving support information GA (FIGS. 9 to 11) are displayed, on the basis of the relative angle X, in any one of the display areas which corresponds to the visual-line movement destination. Therefore, a proper display position can be selected from the plural display areas (G1) to (G5) in conformity with the visual-line movement destination of the driver 5.

When the relative angle X is within the predetermined angle range LS, RS (FIG. 7) in which the visual-line movement to the right or left is relatively small as shown in FIGS. 6 and 9B, the display controller 55 displays the driving support information GA in the display area (G3) corresponding to the straight traveling. Furthermore, when the relative angle X exceeds the angle range LS, RS as shown in FIGS. 10 and 11, the display controller 55 displays the driving support information GA in any one of the display areas (G1), (G2), (G4) and (G5) other than the display area (G3). Accordingly, the driving support information GA can be displayed at a position which is not so greatly deviated from the visual-line movement destination of the driver 5. Furthermore, such a situation that the display position is frequently changed when small curves to the right and left are continued can be suppressed. Accordingly, the driving support information GA can be displayed to be easily watchable for the driver 5.

This embodiment is applied to the information display device 1 for a vehicle in which information is displayed in the area corresponding to the front window 3 located in front of the driver 5. Therefore, even when the visual line of the driver 5 is greatly moved to the right or left due to driving, the driving support information GA can be displayed at a proper position on the front window 3 in conformity with the movement of the visual line. Accordingly, it is unnecessary for the driver 5 to greatly shift his/her visual line and watch the driving support information GA, and the driver can easily perform the driving operation while easily watching the driving support information GA.

In this embodiment, the driving support information GA and the non-driving support information GT (other information) are displayed as the information to be displayed, and the display position of the driving support information GA is changed on the basis of the relative angle X (i.e., the curving degree and the curving direction) whereas the display position of the non-driving support information GT is not changed. Therefore, the driving support information GA can be displayed to be easily and intensively viewable.

The present invention is not limited to the above embodiment, and any modification and application may be made without departing from the subject matter of the present invention.

For example, in the above embodiment, in consideration of the feature that the visual line of the driver 5 is directed to the course (route) at the traveling front side of the vehicle 2, the shape of the road (road condition) of the traveling front side is looked ahead by using the information of road links, and the movement destination of the visual line of the driver 5 is predicted. However, the shape of the road may be looked ahead by specifying the currently traveling zone and the subsequently traveling zone located in front of the currently traveling zone from data containing at least the shape of a travelable route in place of the information of the road links.

In place of the above method, other look-ahead methods may be applied. For example, the following look-ahead method may be adopted. That is, current positions detected by the position detector 52 are stored and accumulated as a traveling record, and when the vehicle 2 is traveling at a place on the traveling record, a zone which is located in front of a currently traveling zone and also located on the traveling record is specified as a subsequently traveling zone. Alternatively, the shape of a road at the traveling front side of the vehicle 2 may be recognized from an image picked up by a front imaging camera for imaging the front side of the vehicle 2 to specify a subsequently traveling zone.

Furthermore, in the above embodiment, the timing at which the display destination of the driving support information GA is changed may be before or just before the vehicle 2 enters the subsequently traveling zone, or in the middle of entrance of the vehicle 2 into the subsequently traveling zone.

Still furthermore, in the above embodiment, the information on the course (route) at the traveling front side is stored in the storage unit 41 in advance. However, the information may be obtained from a communication network (electrical communication line) such as a public wireless network, the internet or the like. The display unit is not limited to the head-up display (HUD), and it may be a projection device for projecting an image onto the front window 3 and enabling a driver to visually recognize a reflection image from the front window 3. Any display unit may be adopted insofar as it displays predetermined information while overlapping the predetermined information with a landscape in the user's visual-line movement range.

In the above embodiment, a control program for performing the display processing, etc. is stored in the information display device 1 for the vehicle in advance. However, the present invention is not limited to this style. The control program may be stored in a computer-readable recording medium such as a magnetic recording medium, an optical recording medium, a semiconductor recording medium or the like, and a computer may read out the control program from the recording medium and execute the control program. Furthermore, the control program may be downloaded from a distribution server or the like through a communication network (electrical communication line).

In the above embodiment, the present invention is applied to an information display device for a vehicle and an information display method for a vehicle which display information for a driver. However, the present invention is broadly applicable to display information device and method for displaying information for a user.

The invention claimed is:

1. An information display device for displaying predetermined information while overlapping the predetermined information as a virtual image with a landscape comprising:
   a prediction unit that obtains information on a route and predicts a visual-line movement destination of a user on the basis of the obtained information; and
   a display controller that changes a display position for the predetermined information on the basis of a prediction result of the prediction unit, wherein the predetermined information contains driving support information that is information for supporting driving and non-driving support information that is information other than the driving support information, the display controller determines an area for displaying the driving support information on the basis of the prediction result of the prediction unit at generating an image for displaying as the virtual image, and the display controller displays the non-driving support information in a predetermined display area.

2. The information display device according to claim 1, wherein the prediction unit specifies a currently traveling zone on a travelable route and a subsequently traveling zone located in front of the currently traveling zone from data containing at least information on a shape of the travelable route, and calculates a relative angle between the currently traveling zone and the subsequently traveling zone, and the display controller changes a display position of the information to a position corresponding to the predicted visual-line movement destination of the user based on the relative angle.

3. The information display device according to claim 2, wherein the prediction unit specifies a road link of the currently traveling zone and a road link of the subsequently traveling zone from information on road links as line segments representing road zones, and calculates a relative angle between the road link of the currently traveling zone and the road link of the subsequently traveling zone.

4. The information display device according to claim 3, wherein the prediction unit specifies the road link of the currently traveling zone on the basis of a current position, and specifies the road link of the subsequently traveling zone on the basis of a guide route to a destination.

5. The information display device according to claim 2, wherein a plurality of display areas are provided for different visual-line movement destinations of the user, and the display controller displays, on the basis of the relative angle, the predetermined information in one of the plurality of display areas, which corresponds to the predicted visual-line movement destination.

6. The information display device according to claim 5, wherein the display controller displays the predetermined information in a display area corresponding to straight traveling when the relative angle is within a predetermined angle range in which visual-line movement to the right or left is relatively small, and displays the predetermined information in a display area other than the display area corresponding to the straight traveling when the relative angle exceeds the predetermined angle range.

7. An information display method for displaying predetermined information while overlapping the predetermined information as a virtual image with a landscape, comprising:

a predicting step of obtaining information on a route and predicting a visual-line movement destination of a user on the basis of the obtained information; and a display control step of changing a display position for the predetermined position on the basis of a prediction result obtained in the predicting step, wherein the predetermined information contains driving support information that is information for supporting driving and non-driving support information that is information other than the driving support information, and the display control step determines an area for displaying the driving support information on the basis of the prediction result of the prediction unit at generating an image for displaying as the virtual image, and displays the non-driving support information in a predetermined display area.

8. The information display method according to claim 7, wherein the predicting step specifies a currently traveling zone on a travelable route and a subsequently traveling zone located in front of the currently traveling zone from map data containing at least information on the travelable route, and calculates a relative angle between the currently traveling zone and the subsequently traveling zone to predict the visual-line movement destination of the user, and the display control step changes a display position for the predetermined information to a position corresponding to the predicted visual-line movement destination of the user based on the relative angle.

9. The information display method according to claim 8, wherein the prediction step specifies a road link of the currently traveling zone and a road link of the subsequently traveling zone from information on road links as line segments representing road zones, and calculates a relative angle between the road link of the currently traveling zone and the road link of the subsequently traveling zone.

10. The information display method according to claim 9, wherein the prediction step specifies the road link of the currently traveling zone on the basis of a current position, and specifies the road link of the subsequently traveling zone on the basis of a guide route to a destination.

11. The information display method according to claim 8, wherein a plurality of display areas are provided for different visual-line movement destinations of the user, and the display control step displays, on the basis of the relative angle, the predetermined information in one of the plurality of display areas, which corresponds to the predicted visual-line movement destination of the user.

12. The information display method according to claim 11, wherein the display control step displays the predetermined information in a display area corresponding to straight traveling when the relative angle is within a predetermined angle range in which visual-line movement to the right or left is relatively small, and displays the predetermined information in a display area other than the display area corresponding to the straight traveling when the relative angle exceeds the predetermined angle range.

13. The information display device for displaying predetermined information while overlapping the predetermined information with a landscape comprising:

a prediction unit that obtains information on a route at a traveling front side and predicts a visual-line movement destination of a user on the basis of the obtained information; and a display controller that changes a display position for the predetermined information on the basis of a prediction result of the prediction unit, wherein the prediction unit specifies a currently traveling zone on a travelable route and a subsequently traveling zone located in front of the currently traveling zone from data containing at least information on a shape of the travelable route, and calculates a relative angle between the currently traveling zone and the subsequently traveling zone, and the display controller changes a display position of the information to a position corresponding to the predicted visual-line movement destination of the user based on the relative angle.

* * * * *